United States Patent
Najmuddin

(10) Patent No.: US 7,398,158 B2
(45) Date of Patent: Jul. 8, 2008

(54) METHOD AND APPARATUS FOR DETECTING FRACTURES USING FREQUENCY DATA DERIVED FROM SEISMIC DATA

(75) Inventor: Ilyas Juzer Najmuddin, Houston, TX (US)

(73) Assignee: Schlumberger Technology Corporation, Houston, TX (US)

(*) Notice: Subject to any disclaimer, the term of this patent is extended or adjusted under 35 U.S.C. 154(b) by 342 days.

(21) Appl. No.: 10/081,090

(22) Filed: Feb. 22, 2002

(65) Prior Publication Data

US 2004/0254730 A1 Dec. 16, 2004

Related U.S. Application Data

(60) Provisional application No. 60/353,698, filed on Jan. 31, 2002.

(51) Int. Cl.
*G06F 19/00* (2006.01)

(52) U.S. Cl. .............................. 702/2; 703/5
(58) Field of Classification Search .............. 702/2, 702/14–16, 18; 367/73, 25, 39; 324/344; 703/10
See application file for complete search history.

(56) References Cited

U.S. PATENT DOCUMENTS

| | | | | |
|---|---|---|---|---|
| 4,554,629 A | * | 11/1985 | Smith, Jr. ................ | 712/36 |
| 4,570,122 A | * | 2/1986 | Leu .......................... | 324/345 |
| 5,870,691 A | * | 2/1999 | Partyka et al. ............ | 702/16 |
| 5,940,778 A | | 8/1999 | Marfurt et al. ............ | 702/16 |
| 5,995,448 A | | 11/1999 | Krehbiel .................... | 367/70 |
| 6,055,482 A | * | 4/2000 | Sudhakar et al. .......... | 702/16 |
| 6,131,071 A | * | 10/2000 | Partyka et al. ............ | 702/16 |
| 6,594,585 B1 | * | 7/2003 | Gersztenkorn ............ | 702/14 |
| 6,697,737 B2 | * | 2/2004 | Jones et al. ............... | 702/2 |
| 2002/0128778 A1 | * | 9/2002 | Pepper et al. ............. | 702/14 |

FOREIGN PATENT DOCUMENTS

WO 0196905 12/2001

OTHER PUBLICATIONS

Dasgupta, Rahul and Roger A. Clark, "Estimation of Q from surface seismic reflection data," *Geophysics*, vol. 63, No. 6, Nov.–Dec. 1998 (pp. 2120–2128).
Varela, Carlos Lopo, Andre L.R. Rosa and Tadeusz J. Ulrych, "Modeling of attenuation and dispersion," *Geophysics*, vol. 58, No. 8, Aug. 1993 (pp. 1167–1173).
"Frequency Attenuation a Fracture Indicator", Houston Geological Society Bulletin, Mar. 2001 by Ilyas Najmuddin.
"Detecting Fracture Zones in the Austin Chalf Using Seismic P–Wave Data", Houston Geological Society Bulletin, Sep. 2001, by Ilyas Najmuddin.

* cited by examiner

*Primary Examiner*—John Barlow
*Assistant Examiner*—Victor J Taylor
(74) *Attorney, Agent, or Firm*—Danita M. J. Maseles; John H. Bouchard; Mark R. Wisner

(57) ABSTRACT

A unique method has been developed which can show the presence of fractures in an Earth formation as a mappable attribute. This method uses the frequency spectra derived from P-wave seismic data over a pair of specific time windows above and below a seismic horizon or reflector of interest to infer the presence or absence of these geologic fractures based on an attenuation of high frequencies. The method produces a parameter value (t*) which is proportional to the shift in frequency spectra amplitudes (i.e., energy) from higher frequencies to lower frequencies, that is, from a time-window above a horizon or reflector of interest to a time-window below the horizon or reflector of interest.

17 Claims, 5 Drawing Sheets

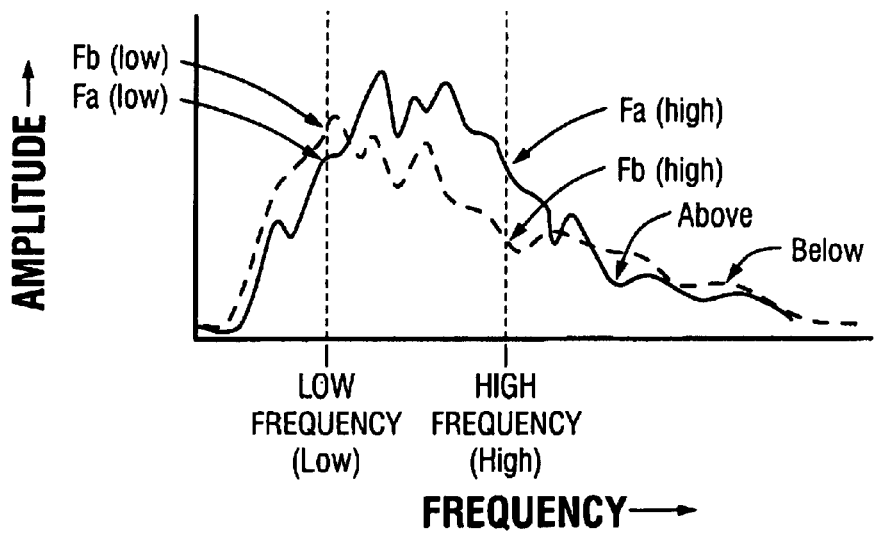
SIX MEASUREMENTS OBTAINED
Fa (high)   High
Fa (low)    Low
Fb (high)
Fb (low)
FIG. 6
F high = Fa (high)/Fb (high)
F low = Fa (low)/Fb (low)
t* = [ln (F high) − ln (F low)]/(High − Low)
FIG. 7
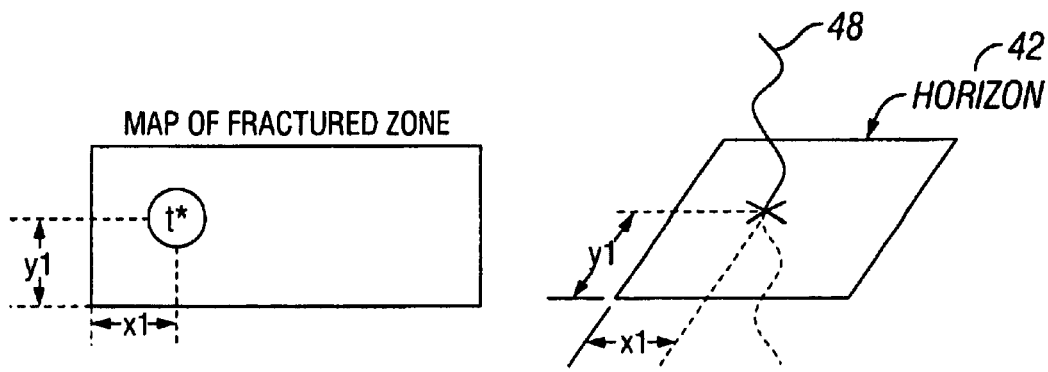
FIG. 8

METHOD AND APPARATUS FOR DETECTING FRACTURES USING FREQUENCY DATA DERIVED FROM SEISMIC DATA

CROSS REFERENCE TO RELATED APPLICATIONS

This is a utility application of prior pending provisional application Ser. No. 60/353,698 filed Jan. 31, 2002, and entitled "Detecting Fractures with frequency data derived from P-wave seismic data".

BACKGROUND

The subject matter of the present invention relates to a method and apparatus responsive to a plurality of seismic data for generating a map illustrating data representative of a frequency shift of a plurality of seismic signals when said seismic signals propagate through a layer of fractured rock in an Earth formation.

Geologic formations containing fractures are an important source of hydrocarbon accumulations and an interesting target for geophysical exploration. The presence of fractures in a geologic formation will act as a high-cut filter with respect to the seismic wave that is propagating through the layer of fractured rock in the Earth formation. This produces a measurable and mappable change in the frequency spectra of the seismic signal propagating above the fractured zone compared to the frequency spectra of the seismic signal propagating below the fractured zone.

SUMMARY

Accordingly, in accordance with the present invention, a unique method has been developed which can show the presence of fractures in an Earth formation as a mappable attribute. This method, described in the Detailed Description hereinbelow, uses the frequency spectra derived from P-wave seismic data, comprised of a plurality of seismic traces, over a pair of specific time windows, which are located above and below a seismic horizon or reflector of interest, to infer the presence or absence of these geologic fractures, in a layer of fractured rock, based on the preferential attenuation of high frequencies. The method produces a parameter (t*), the parameter t* being proportional to the shift in frequency spectra amplitudes (i.e., energy), from higher frequencies to lower frequencies, when the plurality of seismic traces propagate from the time-window located above the seismic horizon or reflector of interest, through the layer of fractured rock, to the time-window below the seismic horizon or reflector of interest. A map is generated based on the computation of t* for all seismic traces in the seismic data.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 6 and 10 illustrate the frequency spectra of FIGS. 4 and 5 superimposed upon one another defining six measurement values;

FIG. 7 illustrates formula for defining 'F high', 'F low', and t*; and

FIGS. 8 and 11 illustrate a map of the fractured rock zone of FIGS. 2 and 3, which maps the attribute t*.

DETAILED DESCRIPTION

Figure 1:
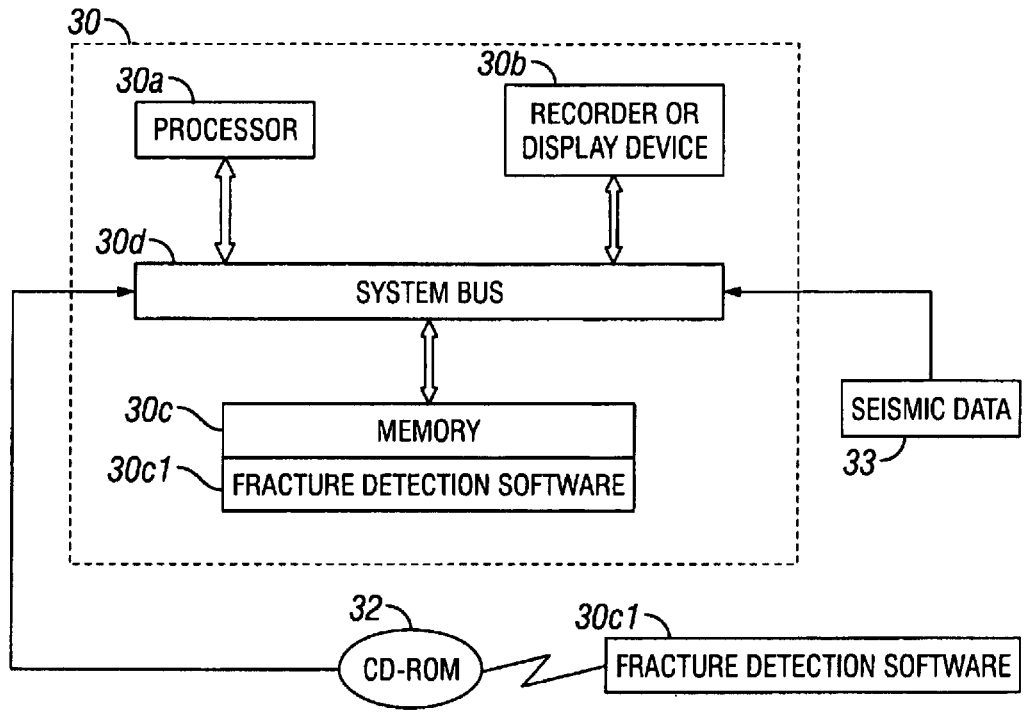
FIG. 1 illustrates a workstation with a CD-Rom adapted to be inserted therein for loading a workstation software package known as the 'Fracture Detection Software' in accordance with the present invention.

Referring to FIG. 1, a workstation or other computer system 30 is illustrated. The computer system 30 may be, for example, a personal computer, a workstation, a mainframe, etc. Examples of possible workstations include a Silicon Graphics Indigo 2 workstation and a Sun SPARC workstation. The computer system 30 stores and executes a plurality of instructions that are used to detect fractures in an Earth formation in response to a plurality of seismic data 33, the seismic data 33 being provided as 'input data' to the computer system 30. The computer system 30 of FIG. 1 includes a processor 30a, a recorder to display device 30b, a memory 30c which is adapted to store the 'Fracture Detection Software' 30c1 in accordance with the present invention, and a system bus 30d to which the Processor 30a and the recorder or display device 30b and the memory 30c are connected. A CD-Rom 32 stores the 'Fracture Detection Software' 30c1 of the present invention, and, when the CD-Rom 32 is inserted into the computer system 30, the Fracture Detection Software 30c1 is loaded from the CD-Rom 32 into the memory 30c of the computer system 30. The processor 30a can now execute the 'Fracture Detection Software' 30c1 instructions and perform its fracture detection for detecting fractures in an Earth formation.

The process steps being practiced by the 'Fracture Detection software' 30c1 of the present invention, when the instructions of the fracture detection software 30c1 are being executed by the processor 30a of the computer system 30 of FIG. 1, will be set forth below followed by an explanation of each of those process steps.

Process Steps

The following steps represent the process steps practiced by the Fracture Detection software 30c1 of FIG. 1:

1. Interpret the reflector (horizon) on the seismic data, recording the two-way seismic travel time.

2. The interpreter specifies the length of the time window (e.g., 100 milliseconds) to extract the frequency spectra.

3. The same time window length is recommended, but not required, on the seismic trace above and below the reflector. This window will be relative to the travel time of the interpreted horizon (see step 1); that is, the window will be parallel to the geologic structure.

4. For every seismic trace where the horizon is interpreted, the interpreter generates two spectra; that is, a first spectra located above the horizon, and a second spectra located below the horizon. This operation can be performed using any number of transforms which result in a frequency representation of the data, i.e., Fast Fourier Transform, Wavelet Transform, Cosine Correlation, etc.

5. The interpreter extracts amplitudes for two specific frequencies (i.e., 10 Hz and 30 Hz) from the spectra above and below the horizon. The objective is to select a high and low frequency from the spectra of each window (above and below the horizon) which are separated as far as possible in the usable bandwidth of the signal yet still contain valid amplitude (energy) above the background noise level. This can be generalized to any technique that measures the change in the energy (amplitude) distribution for the window above the horizon and the window below the horizon.

6. The amplitude values are used as input to the algorithm which compute the 't*' parameter for that seismic trace. The computation of t* is as follows:

$F(\text{high}) = Fa(\text{high})/Fb(\text{high});$ $F(\text{low}) = Fa(\text{low})/Fb(\text{low})$ $t^* = \{\ln[F(\text{high})] - \ln[F(\text{low})]\}/(\text{high}-\text{low})$ where;

F(high) is the ratio of the amplitudes for the higher frequency selected by the user (30 hz for the example) taken from the window above, Fa(high), and the window below, Fb(high);

F(low) is the ratio of the amplitudes for the lower frequency selected by the user (10 hz for the example) taken from the window above, Fa(low), and the window below, Fb(low); and t* is the computed attribute taken from the difference in the natural log (ln) of F(high) and F(low) and this difference then scaled (divided) by the difference in frequency between the measurement points on the spectra (for the example: 30 hz–10 hz=20 hz, 20 was used in the denominator of the t* formula).

7. These steps are applied to every interpreted seismic trace.

8. The results (i.e., the t* parameter) are plotted on a map of the seismic survey. Areas of large t* values are more likely to contain a fractured formation. This map is generated using existing software, provided by Schlumberger Technology Corporation of Houston, Tex., for visualizing a seismically derived attribute in a spatial context.

Explanation of the Process Steps

Figure 2:
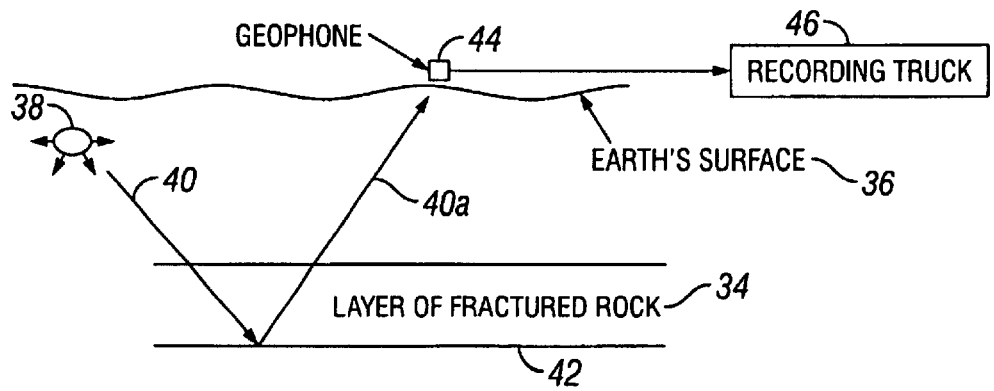
FIG. 2 illustrates a layer of fractured rock in an Earth formation.

Referring to FIG. 2, a layer of fractured rock in an Earth formation is illustrated. In FIG. 2, a layer of fractured rock 34 is located beneath the Earth's surface 36. Assume that an acoustic or explosive energy source 38 generates sonic vibrations or sound waves 40 and those sound waves 40 reflect off a horizon 42 in the Earth's formation. The reflected sound waves 40a are received by a geophone 44 and, as a result, a plurality of seismic traces are recorded in a recording truck 46. Lets examine carefully only 'one such seismic trace' among the plurality of seismic traces recorded in the recording truck 46.

Figure 3:
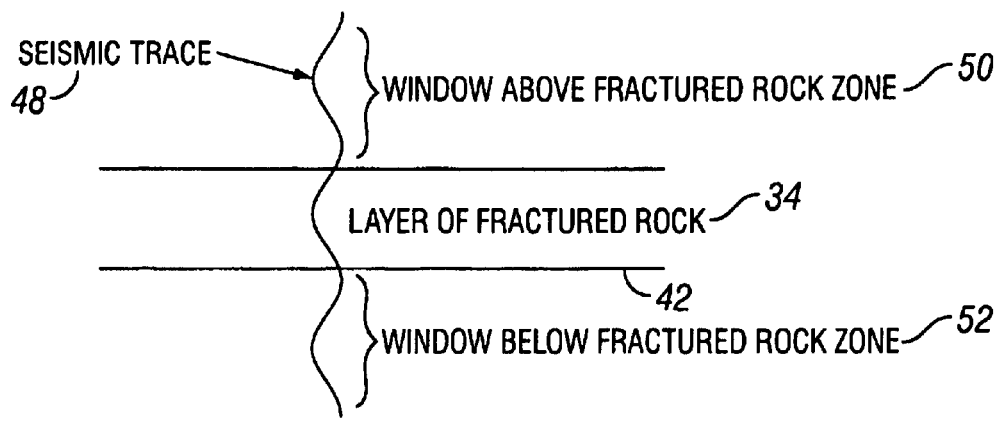
FIGS. 3 and 9 illustrate the layer of fractured rock including a first window above the fractured rock zone and another, second window below the fractured rock zone.
Figure 9:
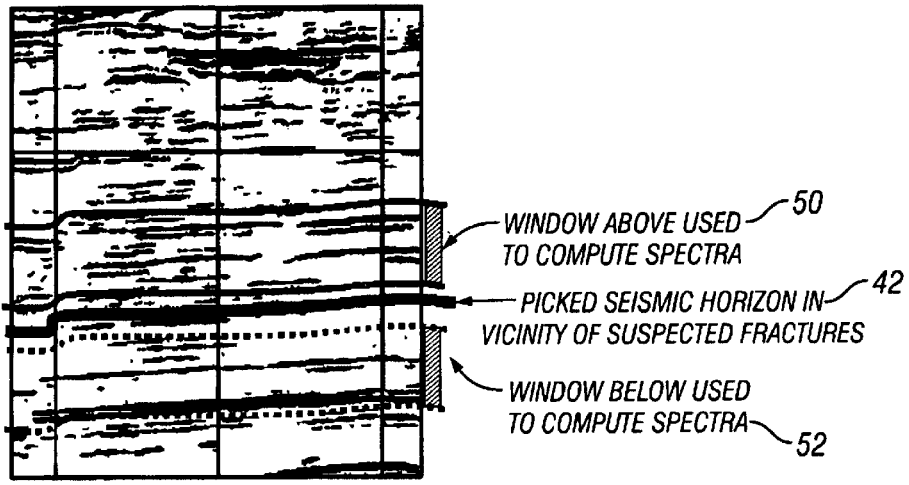

Referring to FIGS. 3 and 9, the 'one such seismic trace' 48 is illustrated in connection with the layer of fractured rock 34 in the formation of FIG. 2. In accordance with the novel method of the present invention, begin the steps of that method by selecting a window 50 along the seismic trace 48 which is disposed above the fractured rock zone, and another window 52 along the seismic trace 48 which is disposed below the fractured rock zone.

Figure 4:
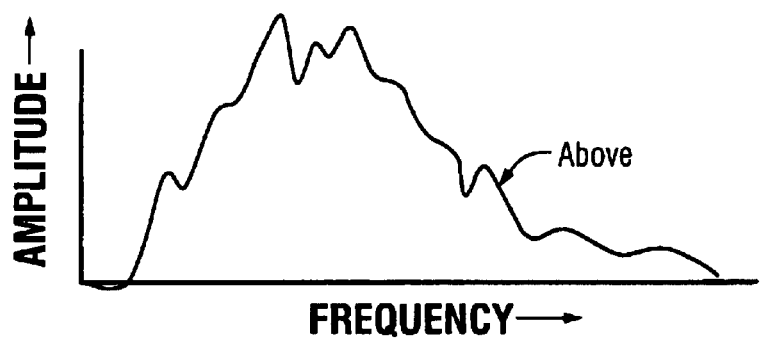
FIG. 4 illustrates the frequency spectrum of the seismic signal in the first window of FIG. 3.

Referring to FIG. 4, generate a frequency spectrum of that portion of the seismic trace 48 which is disposed in the window 50 above the fractured rock zone 50. That frequency spectrum, which is associated with that portion of the seismic trace 48 which is disposed inside the window 50 above the fractured rock zone 50 (hereinafter referred to as "Above") is illustrated in FIG. 4. The frequency spectrum "Above" of FIG. 4 can be generated by using the Fast Fourier Transform or a 'Cosine Correlation Transform'. One example of the use of the Fast Fourier Transform is illustrated in U.S. Pat. No. 5,870,691 to Partyka et al, the disclosure of which is incorporated by reference into this specification. In addition, one example of the use of the 'Cosine Correlation Transform', is disclosed in U.S. patent application Ser. No. 10/017,565, filed Dec. 14, 2001, entitled "Seismic signal processing method and apparatus for generating correlation spectral volumes to determine geologic features", the disclosure of which is also incorporated by reference into this specification.

Figure 5:
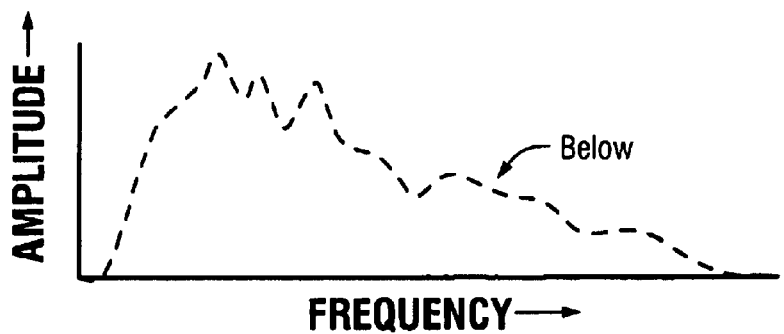
FIG. 5 illustrates the frequency spectrum of the seismic signal in the second window of FIG. 3.

Referring to FIG. 5, generate a frequency spectrum of that portion of the seismic trace 48 which is disposed in the window 52 below the fractured rock zone 52. That frequency spectrum, which is associated with that portion of the seismic trace 48 which is disposed inside the window 52 below the fractured rock zone 52 (hereinafter referred to as "Below") is illustrated in FIG. 5. The frequency spectrum "Below" of FIG. 5 can be generated by using the Fast Fourier Transform or a 'Cosine Correlation Transform'. One example of the use of the Fast Fourier Transform is illustrated in U.S. Pat. No. 5,870,691 to Partyka et al, the disclosure of which has already been incorporated by reference into this specification. In addition, one example of the use of the 'Cosine Correlation Transform', is disclosed in U.S. patent application Ser. No. 10/017,565, filed Dec. 14, 2001, entitled "Seismic signal processing method and apparatus for generating correlation spectral volumes to determine geologic features", the disclosure of which has already been incorporated by reference into this specification.

Figure 10:
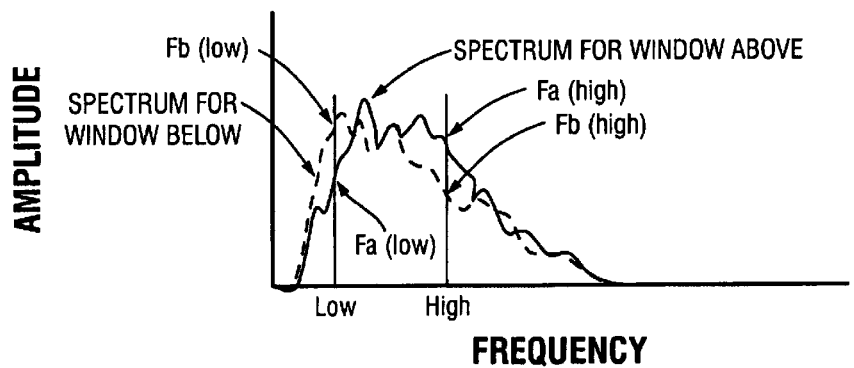

Referring to FIGS. 6 and 10, a frequency spectrum is illustrated, where the frequency spectra of FIG. 4 (i.e, 'Above') is superimposed over the frequency spectra of FIG. 5 (i.e., 'Below'). In the frequency spectrum of FIG. 6, select a low frequency 'Low' and a high frequency 'High' along the 'x' frequency axis. Using the 'Low' frequency in FIG. 6, locate an amplitude on the 'y' amplitude axis of the 'Above' frequency spectra, 'Fa(low)', and locate an amplitude on the 'y' amplitude axis of the 'Below' frequency spectra, 'Fb (low)'. Using the 'High' frequency in FIG. 6, locate an amplitude on the 'y' amplitude axis of the 'Above' frequency spectra, 'Fa(high)', and locate an amplitude on the 'y' amplitude axis of the 'Below' frequency spectra, 'Fb(high)'. Now, as noted in FIG. 6, six different values or measurements have been defined, as follows: (1) Low, (2) High, (3) Fa(low), (4) Fb(low), (5) Fa(high), and (6) Fb(high). Each of these six values or measurements will be used in an algorithm to be described below with reference to FIG. 7.

Referring to FIG. 7, define the value 'F high' as follows:

$F \text{ high} = Fa(\text{high})/Fb(\text{high})$

Define a value 'F low' as follows:

$F \text{ low} = Fa(\text{low})/Fb(\text{low})$

From the values 'F high' and 'F low', define an attribute hereinafter called the "t* attribute", as follows:

$$t^* = [\ln(F\,high) - \ln(F\,low)]/(High - Low)$$

Referring back to FIG. 3, the t* attribute can be defined as follows: recalling that the seismic trace 48 has a particular frequency before the trace 48 propagates through the layer of fractured rock 34, the t* attribute represents an indication of how much that frequency (of the seismic trace 48) shifts or changes when the seismic trace 48 propagates through the layer of fractured rock 34 in FIG. 3.

Referring to FIG. 8, recalling that the seismic trace 48 of FIG. 3 intersected the horizon 42 at a location on the horizon which is defined by the (x, y) coordinates (x1, y1), a 'map of the fractured zone' can be plotted. On the 'map', plot the above defined 't*' attribute on the 'map' at the same coordinate location (x1, y1). Recall that the seismic trace 48 intersected the horizon 42 at coordinate location (x1, y1). Then, assign a unique color to the 't*' attribute which is plotted on the map, the unique color corresponding directly to the t* attribute value plotted on the map. For each t* attribute value plotted on the map, assign a corresponding and possibly different and unique color to each t* attribute. As a result, a user can see the color on the map and associate the color on the map to a unique t* attribute value.

Figure 11:
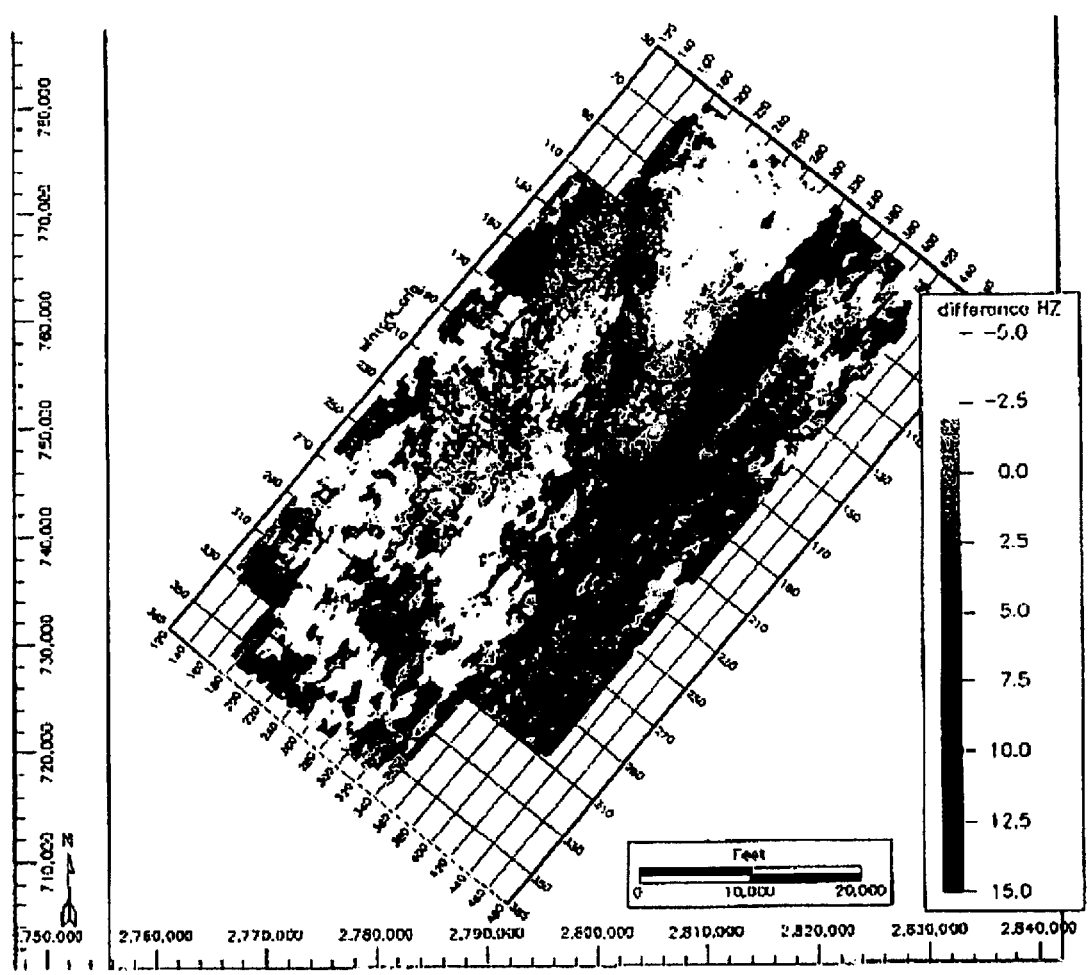

Referring to FIG. 11, the above process plotted the t* attribute on the 'map' using a single seismic trace 48. Repeat the above process for all the other seismic traces which are recorded by the geophone 44 representative of the reflected sound vibrations 40a of FIG. 2. When the above process is repeated for all the other seismic traces, the "map of the Fractured Zone" of FIG. 11 will be the result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of detecting fractures in a fractured zone in an Earth formation comprising the steps of:
 a. propagating a plurality of acoustic waves through the fractured zone so that the plurality of acoustic waves reflect off a horizon in the formation;
 b. receiving a plurality of seismic traces representative of the acoustic waves propagating through the fractured zone wherein a first portion of the seismic traces corresponds to a first window located above the fractured zone in the formation, and a second portion of the seismic traces corresponds to a second window located below the fractured zone in the formation;
 c. generating a first frequency spectrum associated with the first portion of the seismic traces corresponding to the first window;
 d. generating a second frequency spectrum associated with the second portion of the seismic traces corresponding to the second window;
 e. superimposing the first frequency spectrum onto the second frequency spectrum, thereby generating a superimposed frequency spectrum, and defining from the superimposed frequency spectrum a low frequency and a high frequency;
 f. when the low frequency and the high frequency is defined, further defining from the superimposed frequency spectrum a plurality of amplitude values, the plurality of amplitude values including: an amplitude Fa(high) of the first frequency spectrum at the defined high frequency, an amplitude Fa(low) of the first frequency spectrum at the defined low frequency, an amplitude Fb(bigh) of the second frequency spectrum at the defined high frequency, and an amplitude Fb(low) of the second frequency spectrum at the defined low frequency;
 g. from the plurality of amplitude values, defining a t* attribute by subtracting the natural log of the ratio of Fa(low) to Fb(low) from the natural log of the ratio of Fa(high) to Fb(high) to get a numerator and dividing the numerator by a denominator which comprises the defined high frequency less the defined low frequency; and
 h. plotting the t* attribute.

2. The method of claim 1 wherein the first frequency spectrum associated with the first portion of the seismic traces corresponding to the first window is generated using either Fast Fourier Transform, Cosine Correlation Transform, or Wavelet Transform.

3. The method of claim 1 wherein the second frequency spectrum associated with the second portion of the seismic traces corresponding to the second window is generated using either Fast Fourier transform, Cosine Correlation Transform, or Wavelet Transform.

4. A program storage device readable by a machine, tangibly embodying a program of instructions executable by the machine to perform method steps for detecting fractures in a fractured zone in an Earth formation, the method steps comprising:
 a. operating on a plurality of received seismic traces, representative of a plurality of acoustic waves propagating through the fractured zone and reflecting off a horizon in the formation, to define a first portion of the seismic traces corresponding to a first window located above the fractured zone in the formation, and to define a second portion of the seismic traces corresponding to a second window located below the fractured zone in the formation;
 b. generating a first frequency spectrum associated with the first portion of the seismic traces corresponding to the first window;
 c. generating a second frequency spectrum associated with the second portion of the seismic traces corresponding to the second window;
 d. superimposing the first frequency spectrum onto the second frequency spectrum, thereby generating a superimposed frequency spectrum, and defining from the superimposed frequency spectrum a low frequency and a high frequency;
 e. when the low frequency and the high frequency are defined, further defining from the superimposed frequency spectrum a plurality of amplitude values, :including an amplitude Fa(high) of the first frequency spectrum at the defined high frequency, an amplitude Fa(low) of the first frequency spectrum at the defined low frequency, an amplitude Fb(high) of the second frequency spectrum at the defined high frequency, and an amplitude Fb(low) of the second frequency spectrum at the defined low frequency;
 f. from the plurality of amplitude values, defining a t* attribute by subtracting the natural log of the ratio of Fa(low) to Fb(low) from the natural log of the ratio of Fa(high) to Fb(high) to get a numerator and dividing the numerator by a denominator which comprises the defined high frequency less the defined low frequency; and
 g. plotting the t* attribute.

5. The program storage device of claim 4 wherein the first frequency spectrum associated with the first portion of the seismic traces corresponding to the first window is generated using either Fast Fourier Transform, Cosine Correlation Transform, or Wavelet Transform.

6. The program storage device of claim 4 wherein the second frequency spectrum associated with the second portion of the seismic traces corresponding to the second window is generated using either Fast Fourier transform, Cosine Correlation Transform, or Wavelet Transform.

7. An apparatus adapted for detecting fractures in a fractured zone in an Earth formation comprising:
   a. a first means for operating on a plurality of received seismic traces, representative of a plurality of acoustic waves propagating through the fractured zone and reflecting off a horizon in the formation, to define a first portion of the seismic traces corresponding to a first window located above the fractured zone in the formation, and to define a second portion of the seismic traces corresponding to a second window located below the fractured zone in the formation;
   b. a second means for generating a first frequency spectrum associated with the first portion of the seismic traces corresponding to the first window and for generating a second frequency spectrum associated with the second portion of the seismic traces corresponding to the second window;
   c. a third means for superimposing the first frequency spectrum onto the second frequency spectrum, thereby generating a superimposed frequency spectrum, and defining from the superimposed frequency spectrum a low frequency and a high frequency;
   d. a fourth means for further defining, from the superimposed frequency spectrum, a plurality of amplitude values when the low frequency and the high frequency is defined, the plurality of amplitude values including an amplitude Fa(high) of the first frequency spectrum at the defined high frequency, an amplitude Fa(low) of the first frequency spectrum at the defined low frequency, an amplitude Fb(high) of the second frequency spectrum at the defined high frequency, and an amplitude Fb(low) of the second frequency spectrum at the defined low frequency;
   e. a fifth means for defining a t* attribute from the plurality of amplitude values by subtracting the natural log of the ratio of Fa(low) to Fb(low) from the natural log of the ratio of Fa(high) to Fb(high) to get a numerator and dividing the numerator by a denominator which is the defined high frequency less the defined low frequency; and
   f. a sixth means for plotting the t* attribute.

8. The apparatus of claim 7 wherein the second means generates the first frequency spectrum associated with the first portion of the seismic traces corresponding to the first window using either Fast Fourier Transform, Cosine Correlation Transform, or Wavelet Transform.

9. The apparatus of claim 7 wherein the second means generates the second frequency spectrum associated with the second portion of the seismic traces corresponding to the second window using either Fast Fourier transform, Cosine Correlation Transform, or Wavelet Transform.

10. A method of detecting fractures in an Earth formation comprising the steps of:

propagating at least one acoustic wave through an Earth formation so that the acoustic wave is reflected off a horizon in the formation;

receiving a seismic trace representative of the acoustic wave propagating through the formation, a first portion of the seismic trace corresponding to a first window located above the formation and a second portion of the seismic trace corresponding to a second window located below the formation;

generating a first frequency spectrum at least partially associated with the first portion of the seismic trace corresponding to the first window;

generating a second frequency spectrum at least partially associated with the second portion of the seismic trace corresponding to the second window;

comparing the first frequency spectrum to the second frequency spectrum to define a low frequency and a high frequency;

defining an amplitude Fa(high) of the first frequency spectrum at the defined high frequency, an amplitude Fa(low) of the first frequency spectrum at the defined low frequency, an amplitude Fb(high) of the second frequency spectrum at the defined high frequency, and an amplitude Fb(low) of the second frequency spectrum at the defined low frequency;

defining a t* attribute by dividing the difference in the ratio of Fa(low) to Fb(low) and the ratio of Fa(high) to Fb(high) by the defined high frequency less the defined low frequency; and mapping the t* attribute.

11. The method of claim 10 wherein the first frequency spectrum associated with the second portion of the seismic trace corresponding to the first window is generated using Fast Fourier Transform, Cosine Correlation Transform, or Wavelet Transform.

12. The method of claim 10 wherein the second frequency spectrum associated with the second portion of the seismic trace corresponding to the second window is generated using Fast Fourier Transform, Cosine Correlation Transform, or Wavelet Transform.

13. The method of claim 10 wherein either the first window or the second window is entirely above the formation.

14. The method of claim 10 wherein the defined low frequency is the lowest frequency defined by comparing the first frequency spectrum and the second frequency spectrum.

15. The method of claim 10 wherein the defined high frequency is the highest frequency defined by comparing the first frequency spectrum and the second frequency spectrum.

16. The method of claim 10 wherein the first frequency spectrum is compared to the second frequency spectrum by superimposing the first frequency spectrum onto the second frequency spectrum.

17. The method of claim 10 wherein the t* attribute is defined by scaling with the difference in the natural logs of the ratios of Fa(low) to Fb(low) and Fa(high) to Fb(high).

* * * * *